(12) United States Patent
Teraya

(10) Patent No.: US 7,783,408 B2
(45) Date of Patent: Aug. 24, 2010

(54) CONTROLLER FOR INTERNAL COMBUSTION ENGINE

(75) Inventor: Ryuta Teraya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 133 days.

(21) Appl. No.: 12/264,401

(22) Filed: Nov. 4, 2008

(65) Prior Publication Data

US 2009/0171550 A1 Jul. 2, 2009

(30) Foreign Application Priority Data

Dec. 27, 2007 (JP) ............................... 2007-337233

(51) Int. Cl.
*F02D 41/14* (2006.01)
*F02D 45/00* (2006.01)
*F02M 25/07* (2006.01)

(52) U.S. Cl. ....................... 701/102; 123/295; 123/305; 701/103

(58) Field of Classification Search ................. 701/102, 701/103–105, 108; 123/295, 305, 478, 480, 123/568.11
See application file for complete search history.

(56) References Cited

U.S. PATENT DOCUMENTS 6,089,206 A * 7/2000 Suzuki et al. ............... 123/295
6,260,545 B1 * 7/2001 Suzuki ....................... 123/550
2004/0003804 A1 1/2004 Yasui

FOREIGN PATENT DOCUMENTS

| JP | 05-280431 A | 10/1993 |
|---|---|---|
| JP | 09-324683 A | 12/1997 |
| JP | 2001-090598 A | 4/2001 |
| JP | 2001-140687 A | 5/2001 |
| JP | 2002-266682 A | 9/2002 |
| JP | 2003-120380 A | 4/2003 |
| JP | 2004-036473 A | 2/2004 |
| JP | 2005-325697 A | 11/2005 |
| JP | 2007-315193 A | 12/2007 |

* cited by examiner

*Primary Examiner*—Hieu T Vo
(74) *Attorney, Agent, or Firm*—Kenyon & Kenyon LLP

(57) ABSTRACT

An engine has cylinders respectively connected to branch pipes branched from a main pipe as an intake manifold. Fuel injection valves are attached to branch pipes, respectively. Further, branch pipes are connected to branch pipes branched from an EGR pipe on a downstream side of EGR valve, and exhaust gas introduced from EGR valve is fed to each of branch pipes. ECU detects imbalance of air-fuel ratio among cylinders, based on cylinder-by-cylinder air-fuel ratio detected by air-fuel ratio sensors provided on branch pipes as an exhaust manifold. If there is an imbalance in air-fuel ratio among cylinders, EGR valve is closed and imbalance in air-fuel ratio among cylinders is again detected.

6 Claims, 3 Drawing Sheets

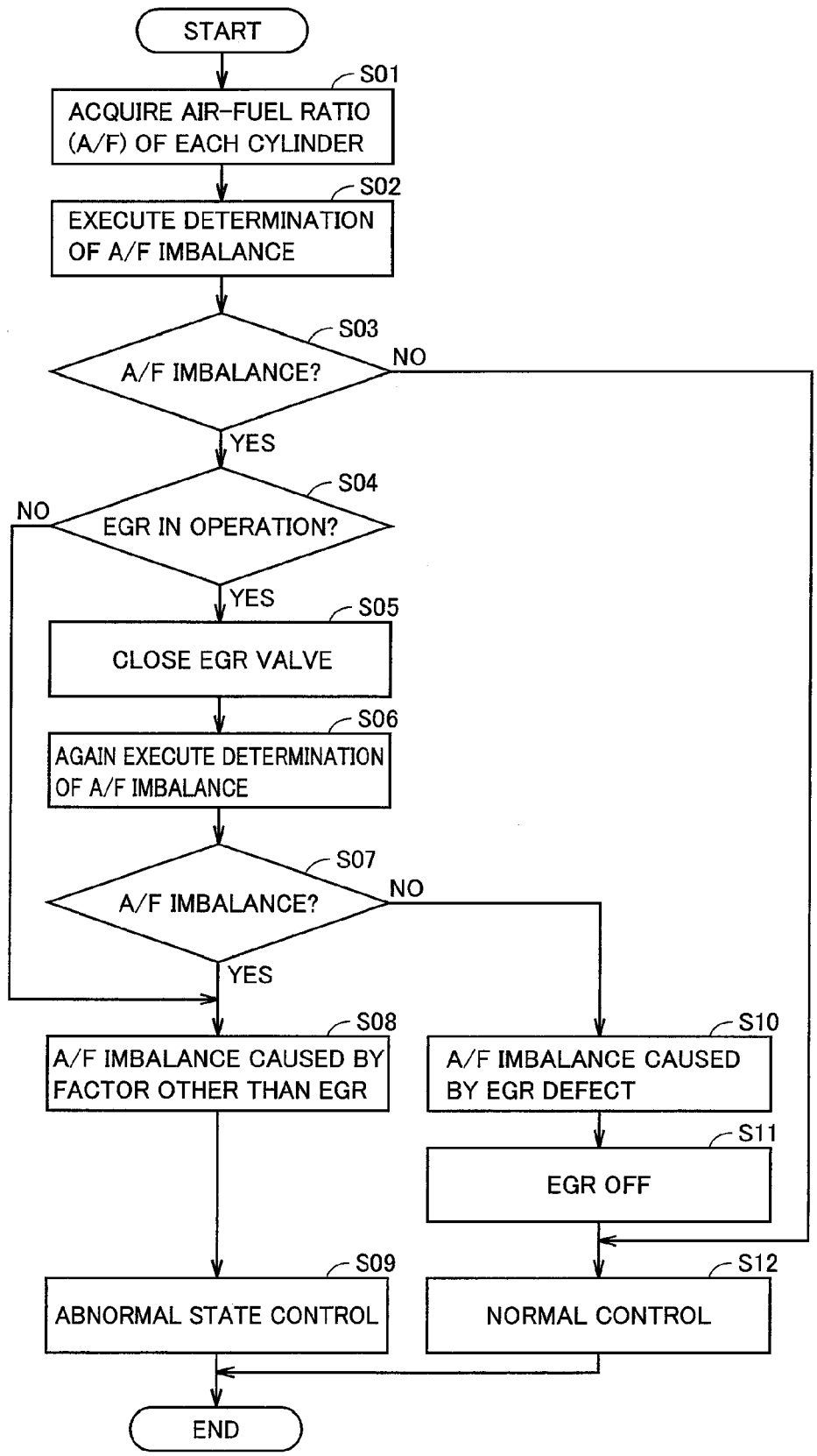

CONTROLLER FOR INTERNAL COMBUSTION ENGINE

This nonprovisional application is based on Japanese Patent Application No. 2007-337233 filed with the Japan Patent Office on Dec. 27, 2007, the entire contents of which are hereby incorporated by reference.

BACKGROUND OF THE INVENTION

1. Field of the Invention

The present invention relates to a controller for an internal combustion engine and, more specifically, to a controller for a multi-cylinder internal combustion engine.

2. Description of the Background Art

In order to follow regulations on emission (emission of harmful gas) that have been made tighter these days, control of air-fuel ratio with higher accuracy has come to be required of an internal combustion engine. Particularly in a multi-cylinder internal combustion engine provided with a plurality of cylinders, imbalance of air-fuel ratio among cylinders (hereinafter also referred to as "A/F imbalance") significantly degrades exhaust property and, therefore, air-fuel ratio control of still higher accuracy is desired.

In connection with the air-fuel ratio control of a multi-cylinder internal combustion engine, Japanese Patent Laying-Open No. 2002-266682, for example, discloses an air-fuel ratio controller for a multi-cylinder internal combustion engine in which variation in air-fuel ratio among cylinders is corrected if air-fuel ratio of a cylinder is varied from ratios of other cylinders.

For an internal combustion engine, an exhaust gas recirculation apparatus (hereinafter referred to as EGR) has been widely known, which recirculates part of exhaust gas in an exhaust manifold to an intake manifold, to reduce nitrogen oxide (NOx) and to improve mileage (see, for example, Japanese Patent Laying-Open Nos. 2005-325697, 2003-120380, H09-324683 and 2001-90598).

EGR, however, influences air-fuel ratio of air-fuel mixture supplied to the internal combustion engine and if there happens to be a defect (such as clogging) in the exhaust gas recirculating passage, the amount of recirculated exhaust gas varies, possibly affecting the air-fuel ratio control. Particularly in the multi-cylinder internal combustion engine mentioned above, a defect at a portion of exhaust gas recirculating passage communicated with intake manifolds of the cylinders causes A/F imbalance and, therefore, there is a concern that such a defect has significant influence on the air-fuel ratio control.

On the other hand, in the multi-cylinder internal combustion engine, generally, an injector for fuel injection is provided in each cylinder and the amount of intake air is not always uniform among the cylinders. Therefore, A/F imbalance may possibly results not only from EGR abnormality but also from other factors such as variation of air passage area among cylinders caused by deposits.

Therefore, it is not always simple to find the cause of A/F imbalance. Conventionally, when A/F imbalance occurs, it has been uniformly determined that normal operation of the internal combustion engine is impossible, and control for abnormal condition of the internal combustion engine has been executed, whereby the vehicle runs in a refuge mode. This limits performance of the vehicle after detection of A/F imbalance.

Further, in repair work, much man-hours have been spent to find the defective portion, lowering operating efficiency.

SUMMARY OF THE INVENTION

An object of the present invention is to provide a controller for an internal combustion engine capable of accurately specifying the cause of air-fuel ratio imbalance among cylinders, in a multi-cylinder internal combustion engine provided with an exhaust gas recirculating apparatus.

According to an aspect, the present invention provides a controller for an internal combustion engine having a plurality of cylinders, wherein the internal combustion engine includes a plurality of intake manifolds connected to the plurality of cylinders respectively, introducing external air to a combustion chamber of a corresponding cylinder of the plurality of chambers, a fuel injection mechanism provided corresponding to each of the plurality of cylinders, injecting fuel to the combustion chamber, a plurality of exhaust manifolds connected to the plurality of cylinders respectively, discharging exhaust gas emitted from the combustion chamber of the corresponding cylinder to the outside, and an exhaust gas recirculating device recirculating part of the exhaust gas to each of the plurality of intake manifolds through a recirculation valve. The controller comprises an air-fuel ratio detecting unit detecting cylinder-by-cylinder air-fuel ratio of each of the plurality of cylinders, and an imbalance determining unit determining whether or not there is any imbalance among air-fuel ratios of the plurality of cylinders, based on the detected cylinder-by-cylinder air-fuel ratios. The imbalance determining unit stops recirculating operation of the exhaust gas if there is an imbalance among air-fuel ratios of the plurality of cylinders, and again determines, while the recirculating operation is stopped, whether there is any imbalance among air-fuel ratios of the plurality of cylinders.

Preferably, if there is no imbalance among air-fuel ratios of the plurality of cylinders while the recirculating operation is stopped, the imbalance determining unit determines that the exhaust gas recirculating device is defective.

More preferably, the controller further includes a driving control unit driving the internal combustion engine under normal driving conditions with the exhaust gas recirculating device set to an inoperative state, if the exhaust gas recirculating device is determined to be defective.

According to the present invention, in the multi-cylinder internal combustion engine, it is possible to accurately determine whether the air-fuel ratio imbalance among cylinders results from a defect of the exhaust gas recirculating apparatus or from other defect of the internal combustion engine. As a result, even after detection of air-fuel ratio imbalance among cylinders, running performance of the vehicle can be improved, and operating efficiency in repair work can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart representing process steps of detecting A/F imbalance, executed by the ECU in accordance with the embodiment.

DESCRIPTION OF THE PREFERRED EMBODIMENTS

Figure 1:
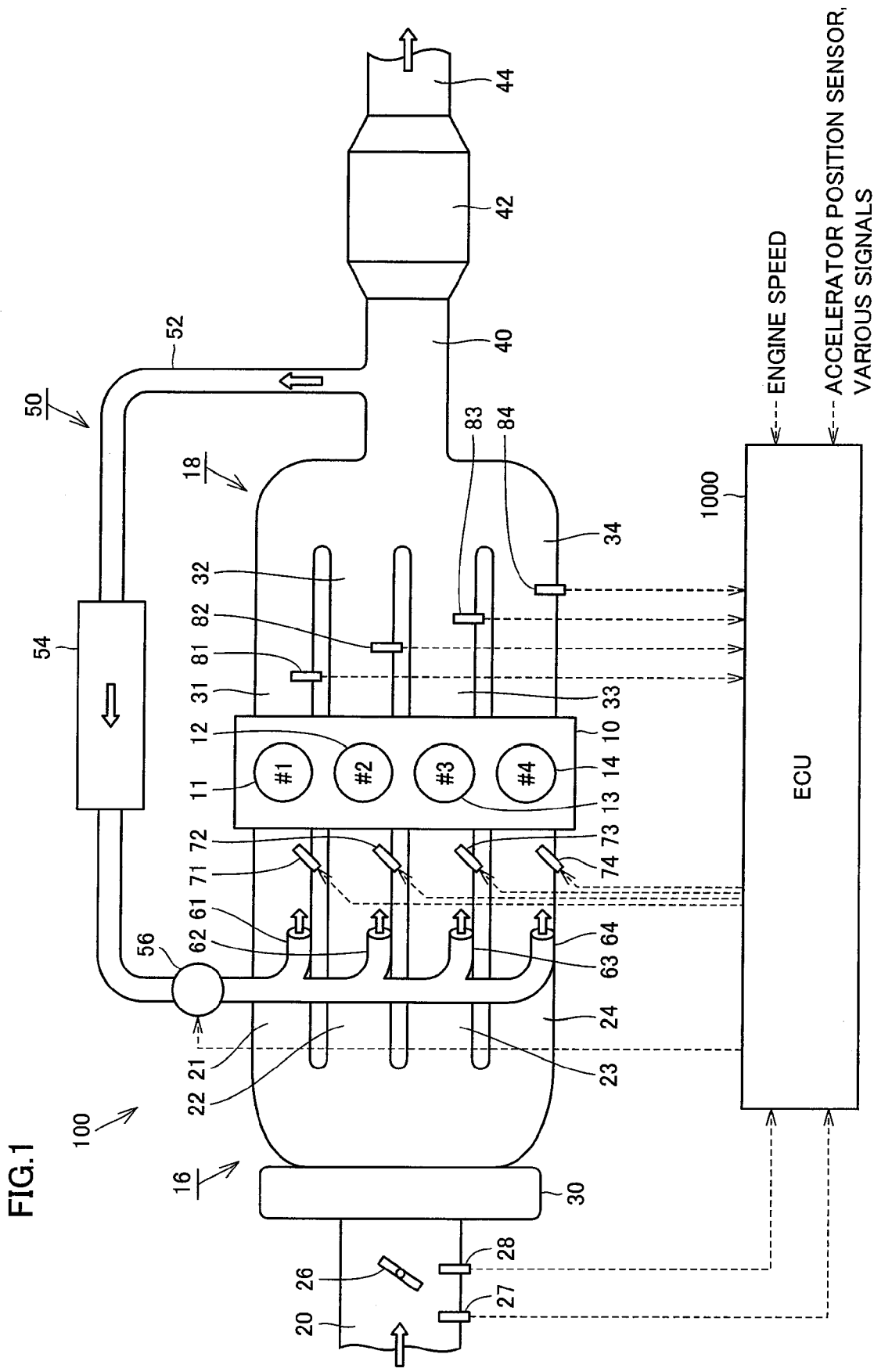
FIG. 1 shows a schematic configuration of an engine system controlled by the controller for an internal combustion engine in accordance with an embodiment of the present invention.

In the following, an embodiment of the present invention will be described in detail with reference to the figures. In the figures, the same or corresponding portions are denoted by the same reference characters.

FIG. 1 shows a schematic configuration of an engine system controlled by the controller for an internal combustion engine in accordance with an embodiment of the present invention.

Referring to FIG. 1, an engine system 100 includes an internal combustion engine 10 (hereinafter simply referred to as an "engine") such as a gasoline engine or a diesel engine as a driving source of a vehicle, and an ECU (Electric Control Unit) 1000 controlling state of operation of engine 10.

Engine 10 is provided with four cylinders 11 to 14, an intake manifold 16, and an exhaust manifold 18. In the figure, cylinders have cylinder numbers #1 to #4 allotted from one end to the other of arrangement, to distinguish one from another. The number of cylinders and the engine type are not specifically limited to the above.

Engine 10 is connected to an intake manifold 16 that is communicated to an intake port of each cylinder. Intake manifold 16 includes a main pipe 20, a surge tank 30, and four branch pipes 21 to 24 branched from main pipe 20 in correspondence with respective cylinders 11 to 14.

Specifically, main pipe 20 is provided with an air flow meter 27 detecting an amount of air sucked to engine 10 through an air cleaner (not shown) for trapping dust in the intake air, and an electronic throttle valve 26 for adjusting the amount of air taken into engine 10.

Electronic throttle valve 26 is provided with a throttle position sensor 28. The amount of intake air detected by air flow meter 27 and opening position of electronic throttle valve 26 detected by throttle position sensor 28 are input to ECU 100.

To branch pipes 21 to 24 branched from main pipe 20, fuel injection valves 71 to 74 are attached respectively, with tip ends protruding inside the pipes. Specifically, branch pipe 21 is connected to cylinder (#1) 11, and fuel injection valve 71 is attached to branch pipe 21. Similarly, branch pipes 22 to 24 are connected to cylinders (#2) 12 to (#4) 14, and in branch pipes 22 to 24, fuel injection valves 72 to 74 are provided, respectively.

Fuel injection valves 71 to 74 are connected to ECU 1000. Each of fuel injection valves 71 to 74 has an electromagnetic coil and a plunger (both not shown) provided at the center thereof. At the time of fuel injection, prescribed electric power is applied to the electromagnetic coil in response to a fuel injection signal from ECU 1000, the plunger is pulled up by magnetic force generated in the electromagnetic coil so that the valve opens, and the fuel is injected.

Other than the structure in which the injector for injection in intake manifold for injecting fuel to the intake port or/and intake manifold as shown in FIG. 1, a structure in which an in-cylinder injector is provided for injecting fuel to the inside of cylinder, or a structure in which both the injector for intake manifold and the in-cylinder injector are both provided, may be adopted.

Further, engine 10 is connected to an exhaust manifold 18 communicated with exhaust ports of respective cylinders 11 to 14. Exhaust manifold 18 includes a main pipe 40 and four branch pipes 31 to 34 branched from main pipe 40 in correspondence with respective cylinders 11 to 14.

Specifically, to the cylinder (#1) 11, branch pipe 31 is connected and, in branch pipe 31, an air-fuel ratio sensor 81 is provided with its sensor element exposed to the exhaust gas in the branch pipe. Similarly, to cylinders (#2) 12 to (#4) 14, branch pipes 32 to 34 are connected, and in branch pipes 32 to 34, air-fuel ratio sensors 82 to 84 are provided, respectively. Air-fuel ratio sensors 81 to 84 are each connected to ECU 1000. Air-fuel ratio sensors 81 to 84 are exposed at arranged positions to exhaust gas in exhaust manifold 18, and provide outputs in accordance with oxygen concentration of the exhaust gas. Receiving the outputs, ECU 1000 can calculate the air-fuel ratio of each cylinder. As air-fuel ratio sensors 81 to 84, an $O_2$ sensor that detects in on-off manner whether the air-fuel ratio of air-fuel mixture burned in engine 100 is rich or lean as compared with the stoichiometric air-fuel ratio may be used.

Main pipe 40 is connected to a catalytic converter 42 that contains ternary catalyst. Catalytic converter 42 is connected to exhaust pipe 44. The exhaust gas after combustion of air-fuel mixture is discharged through exhaust manifold 18 and catalytic converter 42 to the atmosphere.

Further, in exhaust manifold 18, an EGR device 50 is provided, of which flow rate is adjusted by an EGR valve 56 through an EGR pipe 52 as a recirculation path, from the upstream side of catalytic converter 42. EGR device 50, that is, the exhaust gas recirculating device, recirculates part of the exhaust gas emitted from engine 10 to intake manifold 16, which is mixed with new air-fuel mixture and lowers the combustion temperature, whereby generation of nitrogen oxide (NOx) is reduced and pumping loss is reduced to improve mileage.

In the middle of EGR pipe 52, an EGR cooler 54 is provided for cooling the exhaust gas recirculated from the side of exhaust manifold 18. By cooling the exhaust gas, the volume of circulating gas decreases, and therefore, it becomes possible to recirculate the exhaust gas of higher density to intake manifold 16. This improves the ratio between the amount of intake air and the flow rate of exhaust gas, that is, the EGR ratio, and hence, mileage is further improved.

The exhaust gas is passed through EGR pipe 52 and cooled by EGR cooler 54, and then fed to an EGR valve 56. EGR valve 56 is subjected to duty control by ECU 1000. ECU 1000 regulates opening position of EGR valve 56 based on various signals including a signal from an accelerator position sensor (not shown), engine speed and the like.

On the downstream side of EGR valve 56, EGR pipe 52 is branched to four branch pipes 61 to 64, in correspondence with respective cylinders 11 to 14. Specifically, branch pipe 61 is connected to branch pipe 21 that is connected to cylinder 11. Similarly, branch pipes 62 to 64 are connected to branch pipes 22 to 24, respectively. Thus, the exhaust gas introduced to EGR valve 56 is fed through branch pipes 61 to 64 to branch pipes 21 to 24 of intake manifold 16, respectively.

In the engine system in accordance with the present embodiment, the following systems are incorporated, in addition to EGR device 50 as described above.

To the engine system, a fuel injection control system is introduced, in which the amount of intake air is detected by air flow meter 27, and the amount of fuel injection from respective fuel injection valves 71 to 74 are adjusted accordingly. ECU 1000 controls the amount and timing of fuel injection in accordance with the engine speed and engine load so that optimal combustion can be attained in each of the cylinders 11 to 14, based on the signals from various sensors.

Further, in the engine system, the amount of fuel injection is determined based on the engine speed and the amount of intake air (detected by air flow meter 27). Air-fuel ratio after starting is feed-back controlled using signals from air-fuel ratio sensors 81 to 84. Specifically, by the fuel injection control, a basic injection time calculated in accordance with the state of engine 10 is corrected by signals from various sensors, and fuel injection timing and fuel injection amount are controlled accordingly.

Further, to the engine system, an ignition timing control system is introduced. ECU 1000 calculates an optimal ignition timing based on signals from various sensors, and outputs an ignition signal to an igniter-combined type ignition coil (not shown). The ignition timing is determined by an initially set ignition timing, or basic advance angle and corrected advance angle. Further, to the engine system, a knock control system is introduced, in which, when occurrence of a knock is detected based on a knock detection signal from a knock sensor (not shown), the ignition timing is retarded from the basic ignition timing (ignition timing determined in accordance with engine speed and engine load) and the timing is gradually advanced after the knock stops.

The engine ignition timing is calculated by ECU 1000 in accordance with the state of running, based on an engine speed signal, a signal from a cum position sensor, a throttle valve opening position signal, an engine coolant signal and the like, and an ignition signal is output to the igniter-combined ignition coil. Specifically, by the ignition timing control, the basic ignition timing calculated in accordance with the state of engine 10 is corrected by signals from various sensors, and a good timing of ignition is calculated.

Further, to the engine system, a throttle control system is introduced. By the throttle control system, opening position of electronic throttle valve 26 calculated in accordance with the state of engine 10 is corrected by the signals from various sensors, so that an appropriate open position is attained. Specifically, ECU 1000 regulates the opening position of electronic throttle valve 26 using a throttle motor (not shown), so that an open position of electronic throttle valve 26 appropriate for the state of combustion of engine 10 is realized.

In engine system 100 structured as described above, ECU 1000 detects A/F imbalance, which is an imbalance of air-fuel ratio among cylinders, based on the air-fuel ratio of each cylinder (cylinder-by-cylinder air-fuel ratio) detected by air-fuel ratio sensors 81 to 84. A/F imbalance is undesirable considering emission. If A/F imbalance occurs, exhaust gas having air-fuel ratio biased to rich or lean side would be emitted from each of the cylinders even if average air-fuel ratio of all cylinders could be kept at the stoichiometric air-fuel ratio. The exhaust gas with rich air-fuel ratio possibly emits HC or CO, and the exhaust gas with lean air-fuel ratio possibly emits NOx.

(Control Structure)

Next, referring to FIG. 2, the control structure for realizing the A/F imbalance detecting operation executed by ECU 1000 in accordance with the present embodiment will be described.

Figure 2:
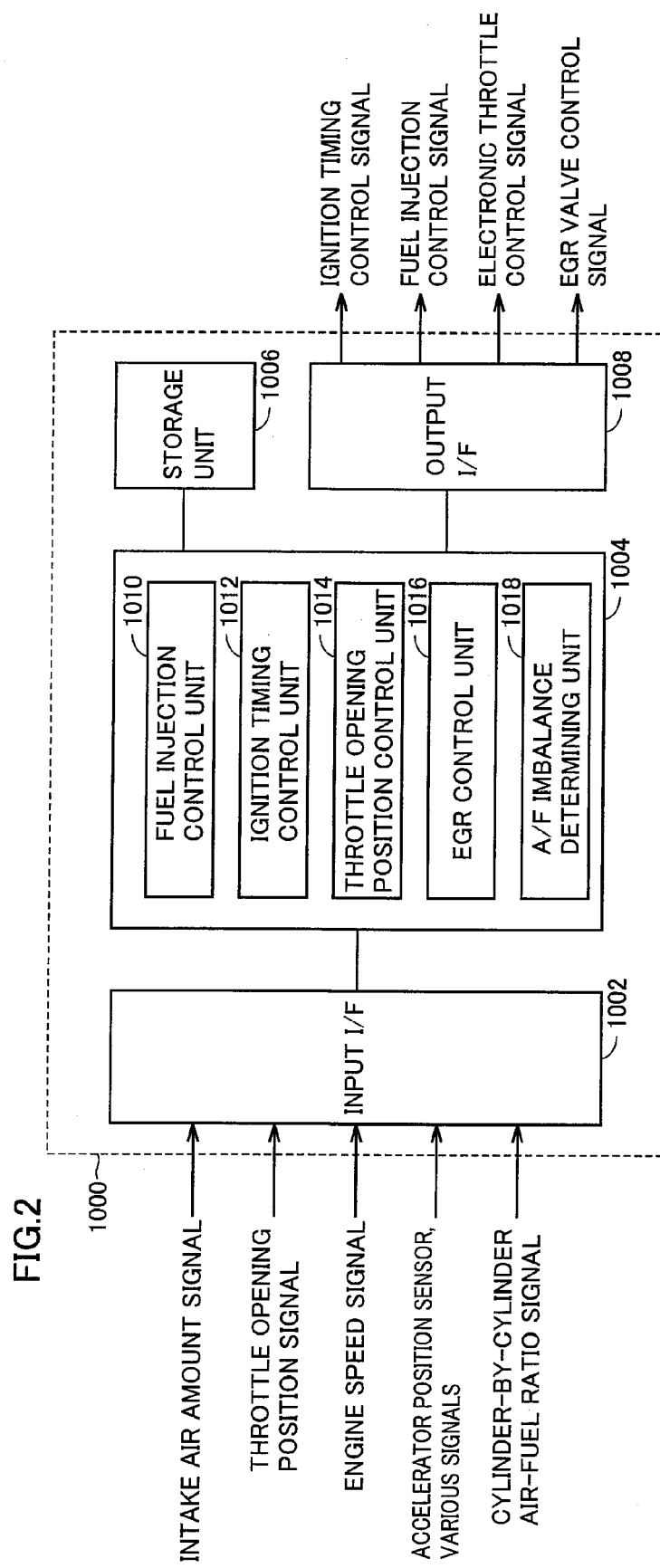
FIG. 2 is a block diagram showing a control structure of an ECU as the controller for the internal combustion engine in accordance with the embodiment.

FIG. 2 is a block diagram showing a control structure of ECU 1000 as the controller for an internal combustion engine in accordance with the present embodiment. Each of the functional blocks shown in FIG. 2 is typically realized by ECU 1000 executing a program stored in advance, and part of or all of the functions may be implemented by dedicated hardware.

Referring to FIG. 2, ECU 1000 includes an input interface (hereinafter denoted by input I/F) 1002, an operating unit 1004, a storage 1006, and an output interface (hereinafter denoted as output I/F) 1008.

Input I/F 1002 receives various signals including an intake air amount signal from air flow meter 27, a throttle opening position signal from throttle position sensor 28, an engine speed signal from a crank position sensor (not shown) and a signal from an accelerator position sensor (not shown), and cylinder-by-cylinder air-fuel ratio signals from air-fuel ratio sensors 81 to 84, and transmits these received signals to operating unit 1004.

Storage unit 1006 stores various pieces of information, programs, threshold values, maps and the like, reads data from operating unit 1004 and stores data from operating unit 1004, as needed.

Operating unit 1004 includes a fuel injection control unit 1010, an ignition timing control unit 1012, a throttle opening position control unit 1014, an EGR control unit 1016, and an A/F imbalance determining unit 1018.

Fuel injection control unit 1010 receives the throttle open position signal, the intake air amount signal, the cylinder-by-cylinder air-fuel ratio signal, the engine speed signal, a temperature of cooling water, a temperature of intake air and a vehicle speed signal, and corrects the basic fuel injection timing calculated in accordance with the state of engine 10 with the signals from various sensors, and thereby executes fuel injection timing control and fuel injection amount control. Fuel injection control unit 1010 generates fuel injection control signals that correspond to fuel injection valves 71 to 74, respectively, and outputs the signals to fuel injection valves 71 to 74 through output I/F 1008.

Ignition timing control unit 1012 receives the throttle open position signal, the intake air amount signal, the cylinder-by-cylinder air-fuel ratio signal, the engine speed signal, a temperature of cooling water, a temperature of intake air and a vehicle speed signal, and corrects the basic ignition timing calculated in accordance with the state of engine 10 with the signals from various sensors, and thereby calculates a good ignition timing. Ignition timing control unit 1012 generates an ignition timing control signal and outputs the signal to the igniter-combined ignition coil of engine 10 through output I/F 1008.

Throttle opening position control unit 1014 controls electronic throttle valve 26 so that it attains to an appropriate opening position in accordance with the state of combustion of engine 10. Throttle opening position control unit 1014 outputs an electronic throttle control signal to electronic throttle valve 26 through output I/F 1008.

EGR control unit 1016 sets in advance a range in which EGR device 50 is operated, of the operation state of engine 10. If it is determined based on the signals from various sensors that the state of operation of engine 10 is in the EGR operating range, EGR control unit opens EGR valve 56. Here, EGR control unit 1016 generates an EGR valve control signal for adjusting the opening position of EGR valve 56 based on the state of operation of engine 10, and outputs the signal to EGR valve 56.

EGR control unit 1016 sets an EGR operation determination flag to "1" if the state of operation of engine 10 is in the EGR operating range, and if the state of operation of engine 10 is not in the EGR operating range, clears the EGR operation determination flag to "0".

A/F imbalance determining unit 1018 determines whether or not there is any A/F imbalance, that is, imbalance of cylinder-by-cylinder air-fuel ratio, based on the air-fuel ratio of each cylinder (cylinder-by-cylinder air-fuel ratio) detected by air-fuel ratio sensors 81 to 84. Specifically, A/F imbalance determining unit 1018 calculates deviation of cylinder-bycylinder air-fuel ratio, and if the deviation exceeds a predetermined threshold value, it determines that there is an A/F imbalance.

Here, the A/F imbalance may be caused by defects on the side of engine 10 and on the side of EGR device 50.

Specifically, defect on the side of engine 10 may include reduction of air passage area of a branch pipe connected to a specific cylinder, caused by fuel or oil existing in intake manifold 16 carbonized and deposited as it touches a wall surface of high temperature. Further, the defect may include failure of fuel injection control including fuel injection valves 71 to 74, variation of intake air temperature among cylinders, and failure of air-fuel ratio sensors 81 to 84.

On the other hand, defect on the side of EGR device 50 may include reduction of air passage area of a specific branch pipe caused by deposits on the specific one of branch pipes 61 to 64 branched from EGR pipe 52, or reduction of air passage area of a specific branch pipe caused by freezing of water vapor or fuel on the specific branch pipe.

Therefore, even when occurrence of A/F imbalance is simply detected, it is difficult to specify the cause of A/F imbalance. As a result, much man-hours have been spent to find the defective portion, lowering operating efficiency.

Further, as it is difficult to specify the cause of A/F imbalance, it has been a common practice to uniformly determine that normal operation of internal combustion engine is impossible, and to execute control for abnormal condition of the internal combustion engine, whereby the vehicle runs in a refuge mode. This limits performance of the vehicle after detection of A/F imbalance.

Therefore, in the present embodiment, A/F imbalance determining unit 1018 is adapted to detect the A/F imbalance and to specify the cause of A/F imbalance from the result of detection.

Specifically, A/F imbalance determining unit 1018 determines whether or not A/F imbalance occurred, based on the cylinder-by-cylinder air-fuel ratio detected by air-fuel ratio sensors 81 to 84. If there is an A/F imbalance, it is further determined whether EGR device 50 is operating or not. Specifically, A/F imbalance determining unit 1018 determines whether the EGR operation determination flag is "1" or not. If the EGR operation determination flag is "1", it determines that EGR device 50 is operating, and closes the EGR valve 56. With EGR valve 56 closed, whether or not there is any A/F imbalance is again determined. Specifically, A/F imbalance determining unit 1018 executes detection of A/F imbalance before and after closing EGR valve 56.

Accordingly, if there is A/F imbalance before and after closing EGR valve 56, it means that the cause of A/F imbalance is not the defect of EGR device 50. Namely, it can be determined that EGR device 50 is normal and the A/F imbalance is caused by a factor other than EGR device 50 (i.e. defect on the side of engine 10).

If A/F imbalance occurs before closing EGR valve 56 and A/F imbalance does not occur after closing EGR valve 56, it can be determined that the cause of A/F imbalance is a defect of EGR device 50.

In this manner, as the operation for detecting A/F imbalance is effected before and after closing EGR valve 56, whether the A/F imbalance has been caused by a defect on the side of EGR device 50 or by other factor can be distinguished.

This enables quick identification of failed portion during repair work and, therefore, operation efficiency can be improved. Specifically, if the A/F imbalance is caused by a defect of EGR device 50, a branch pipe of which air passage area has been reduced can be found from the cylinder-by-cylinder air-fuel ratio. If the A/F imbalance is caused by a defect on the side of engine 10, a defective cylinder can be found from the cylinder-by-cylinder air-fuel ratio.

Further, if it is determined that A/F imbalance is caused by a defect of EGR device 50, it is possible to continue normal operation of engine 10 with EGR device 50 set to an inoperative state. As a result, running performance of the vehicle after detecting A/F imbalance can be improved.

FIG. 3 is a flowchart representing process steps of detecting A/F imbalance, executed by the ECU 1000 in accordance with the embodiment. The process steps shown in FIG. 3 are realized by ECU 1000 functioning as respective control blocks shown in FIG. 3.

Referring to FIG. 3, ECU 1000 functioning as A/F imbalance determining unit 1018 obtains cylinder-by-cylinder air-fuel ratio signals from air-fuel ratio sensors 81 to 84 through input I/F 1002 (step S01), and determines whether there is A/F imbalance based on the cylinder-by-cylinder air-fuel ratio signals (step S02).

If the deviation of cylinder-by-cylinder air-fuel ratio is not higher than the prescribed threshold value and it is determined that there is no A/F imbalance (NO at step S03), ECU 1000 functioning as A/F imbalance determining unit 1018 determines that engine 10 and EGR device 50 are both normal. Receiving the result of determination from A/F imbalance determining unit 1018, ECU 1000 functioning as fuel injection control unit 1010, ignition timing control unit 1012 and throttle opening position control unit 1014 determines that normal operation of engine 10 is possible and executes normal control, so that the vehicle runs normally (step S12).

On the contrary, if the deviation of cylinder-by-cylinder air-fuel ratio is higher than the prescribed threshold value and it is determined that there is A/F imbalance (YES at step S03), ECU 1000 functioning as A/F imbalance determining unit 1018 refers to the EGR operation determination flag and determines whether or not the EGR device 50 is operating (step S04).

If the EGR operation determination flag is "0" (NO at step S04), ECU 1000 functioning as A/F imbalance determining unit 1018 determines that EGR device 50 is not operating and determines that the A/F imbalance is caused by a factor (defect on the side of engine 10) other than the EGR device 50 (step S08).

Receiving the result of determination from A/F imbalance determining unit 1018, ECU 1000 functioning as fuel injection control unit 1010, ignition timing control unit 1012 and throttle opening position control unit 1014 determines that normal operation of engine 10 is impossible and executes abnormal state control for driving under predetermined driving conditions, so that the vehicle runs in a refuge mode (step S09).

If the EGR operation determination flag is "1" (YES at step S07), ECU 1000 functioning as A/F imbalance determining unit 1018 determines that EGR device 50 is operating, and closes EGR valve 56 (step S05).

Further, ECU 1000 functioning as A/F imbalance determining unit 1018 again determines whether or not there is any A/F imbalance, based on cylinder-by-cylinder air-fuel ratio (step S06).

If the deviation of cylinder-by-cylinder air-fuel ratio is higher than the prescribed threshold value and it is determined that there is A/F imbalance (YES at step S06), ECU 1000 functioning as A/F imbalance determining unit 1018 determines that the A/F imbalance is caused by a factor (i.e. defect on the side of engine 10) other than EGR device 50 (step S08).

Receiving the result of determination from A/F imbalance determining unit 1018, ECU 1000 functioning as fuel injection control unit 1010, ignition timing control unit 1012 and throttle opening position control unit 1014 determines that normal operation of engine 10 is impossible and executes abnormal state control, so that the vehicle runs in a refuge mode (step S09).

On the contrary, if the deviation of cylinder-by-cylinder air-fuel ratio is not higher than the prescribed threshold value and it is determined that there is no A/F imbalance (NO at step S07), ECU 1000 functioning as A/F imbalance determining unit 1018 determines that A/F imbalance is caused by a defect of the EGR device (step S10). In this case, ECU 1000 functioning as A/F imbalance determining unit 1018 sets EGR device 50 to an inoperative state (EGR OFF) (step S11). Then, ECU 1000 functioning as EGR control unit 1016 clears the EGR determination flag to "0".

Further, receiving the result of determination from A/F imbalance determining unit 1018, ECU 1000 functioning as fuel injection control unit 1010, ignition timing control unit 1012 and throttle opening position control unit 1014 determines that normal operation of engine 10 is possible and executes normal control, so that the vehicle runs normally (step S12).

As described above, according to the embodiment of the present invention, A/F imbalance detecting operation is performed before and after closing the EGR valve and, therefore, it is possible to distinguish whether the A/F imbalance is caused by a defect on the side of EGR device or by other factor. This enables quick identification of failed portion during repair work and, therefore, operation efficiency can be improved.

Further, if it is determined that A/F imbalance is caused by a defect of the EGR device, it is possible to continue normal operation of engine 10 by setting the EGR device to an inoperative state. As a result, running performance of the vehicle after detecting A/F imbalance can be improved.

In the engine system configuration shown in FIG. 2, engine 10 corresponds to the "internal combustion engine" of the present invention, and EGR device 50 corresponds to the "exhaust gas recirculating device" of the present invention. Further, ECU 1000 corresponds to the "air-fuel ratio detecting unit", "imbalance determining unit", and "drive control unit." Though various functional blocks forming these means have been described as software realized by a CPU (Central Processing Unit) as engine ECU 1000 executing programs stored in the storage unit, these functional blocks may be implemented by hardware. Such programs are recorded on a recording medium and mounted on the vehicle.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A controller for an internal combustion engine having a plurality of cylinders, wherein
said internal combustion engine including:
a plurality of intake manifolds connected to said plurality of cylinders respectively, introducing external air to a combustion chamber of a corresponding cylinder of said plurality of cylinders,
a fuel injection mechanism provided corresponding to each of said plurality of cylinders, injecting fuel to said combustion chamber,
a plurality of exhaust manifolds connected to said plurality of cylinders respectively, discharging exhaust gas emitted from said combustion chamber of the corresponding cylinder to the outside, and
an exhaust gas recirculating device recirculating part of said exhaust gas to each of said plurality of intake manifolds through a recirculation valve;
said controller comprising:
an air-fuel ratio detecting unit detecting cylinder-by-cylinder air-fuel ratio of each of said plurality of cylinders, and
an imbalance determining unit determining whether or not there is any imbalance among air-fuel ratios of said plurality of cylinders, based on the detected cylinder-by-cylinder air-fuel ratios; wherein
said imbalance determining unit stops recirculating operation of said exhaust gas if there is an imbalance among air-fuel ratios of said plurality of cylinders, and again determines, while said recirculating operation is stopped, whether there is any imbalance among air-fuel ratios of said plurality of cylinders.

2. The controller for an internal combustion engine according to claim 1, wherein
if there is no imbalance among air-fuel ratios of said plurality of cylinders while said recirculating operation is stopped, said imbalance determining unit determines that said exhaust gas recirculating device is defective.

3. The controller for an internal combustion engine according to claim 2, further comprising
a driving control unit driving said internal combustion engine under normal driving conditions with said exhaust gas recirculating device set to an inoperative state, if said exhaust gas recirculating device is determined to be defective.

4. A control method for an internal combustion engine having a plurality of cylinders, wherein
said internal combustion engine including:
a plurality of intake manifolds connected to said plurality of cylinders respectively, introducing external air to a combustion chamber of a corresponding cylinder of said plurality of cylinders,
a fuel injection mechanism provided corresponding to each of said plurality of cylinders, injecting fuel to said combustion chamber,
a plurality of exhaust manifolds connected to said plurality of cylinders respectively, discharging exhaust gas emitted from said combustion chamber of the corresponding cylinder to the outside, and
an exhaust gas recirculating device recirculating part of said exhaust gas to each of said plurality of intake manifolds through a recirculation valve;
said control method comprising the steps of:
detecting cylinder-by-cylinder air-fuel ratio of each of said plurality of cylinders, and
determining whether or not there is any imbalance among air-fuel ratios of said plurality of cylinders, based on the detected cylinder-by-cylinder air-fuel ratios; wherein
said step of determining stops recirculating operation of said exhaust gas if there is an imbalance among air-fuel ratios of said plurality of cylinders, and again determines, while said recirculating operation is stopped, whether there is any imbalance among air-fuel ratios of said plurality of cylinders.

5. The control method for an internal combustion engine according to claim 4, wherein
if there is no imbalance among air-fuel ratios of said plurality of cylinders while said recirculating operation is stopped, said step of determining determines that said exhaust gas recirculating device is defective.

6. The control method for an internal combustion engine according to claim 5, further comprising the step of
driving said internal combustion engine under normal driving conditions with said exhaust gas recirculating device set to an inoperative state, if said exhaust gas recirculating device is determined to be defective.

* * * * *